US008663815B2

(12) United States Patent
Elia et al.

(10) Patent No.: US 8,663,815 B2
(45) Date of Patent: *Mar. 4, 2014

(54) VEHICULAR TRANSMISSION PARTS

(75) Inventors: Andri E. Elia, Chadds Ford, PA (US); Michael R. Day, Bloomfield Hills, MI (US); Jonathan McCrea, Toronto (CA); Glenn Steed, Brantford (CA); Andrew Wang, Toronto (CA)

(73) Assignee: Integran Technologies, Inc., Ontario (CA)

( * ) Notice: Subject to any disclaimer, the term of this patent is extended or adjusted under 35 U.S.C. 154(b) by 631 days.

This patent is subject to a terminal disclaimer.

(21) Appl. No.: 12/681,353

(22) PCT Filed: Oct. 1, 2008

(86) PCT No.: PCT/US2008/011363
§ 371 (c)(1),
(2), (4) Date: Aug. 3, 2010

(87) PCT Pub. No.: WO2009/045436
PCT Pub. Date: Apr. 9, 2009

(65) Prior Publication Data
US 2010/0294973 A1 Nov. 25, 2010

Related U.S. Application Data

(60) Provisional application No. 60/997,670, filed on Oct. 4, 2007.

(51) Int. Cl.
*B32B 15/08* (2006.01)
*B32B 1/08* (2006.01)
*B32B 15/20* (2006.01)
*B32B 7/02* (2006.01)

(52) U.S. Cl.
USPC ........... 428/626; 428/671; 428/35.8; 428/212

(58) Field of Classification Search
USPC ................................ 428/35.8, 626, 671, 212
See application file for complete search history.

(56) References Cited

U.S. PATENT DOCUMENTS

| | | | |
|---|---|---|---|
| 3,544,432 A | 12/1970 | Ishii et al. | |
| 4,078,445 A | 3/1978 | Kiser, Jr. | |
| 4,118,372 A | 10/1978 | Schaefgen | |
| 4,306,489 A | 12/1981 | Driver et al. | |
| 4,349,421 A | 9/1982 | Khattab | |
| 4,377,647 A | 3/1983 | Durbin et al. | |
| 4,406,558 A | 9/1983 | Kochendorfer et al. | |
| 4,552,626 A | 11/1985 | Stevenson | |
| 4,681,712 A | 7/1987 | Sakakibara et al. | |
| 4,753,456 A | 6/1988 | Booher | |
| 4,851,271 A | 7/1989 | Moore, III et al. | |
| 5,087,657 A | 2/1992 | Qureshi et al. | |
| 5,324,766 A | 6/1994 | Ikejiri et al. | |
| 5,352,266 A | 10/1994 | Erb et al. | |
| 5,433,797 A | 7/1995 | Erb et al. | |
| 5,899,778 A | 5/1999 | Hiraoka et al. | |
| 6,235,408 B1 | 5/2001 | Tamura et al. | |
| 6,536,566 B2 | 3/2003 | Hasegawa et al. | |
| 6,595,341 B1 | 7/2003 | Venz | |
| 6,598,581 B2 | 7/2003 | Kempf | |
| 6,832,587 B2 | 12/2004 | Wampula et al. | |
| 6,846,261 B2 | 1/2005 | Lev et al. | |
| 7,320,832 B2 * | 1/2008 | Palumbo et al. | 428/548 |
| 7,553,553 B2 | 6/2009 | Palumbo et al. | |
| 8,247,050 B2 | 8/2012 | McCrea et al. | |
| 8,367,170 B2 * | 2/2013 | Elia et al. | 428/35.8 |
| 2001/0053541 A1 * | 12/2001 | Su et al. | 435/91.2 |
| 2002/0072335 A1 | 6/2002 | Watanabe | |
| 2004/0005473 A1 | 1/2004 | Matteucci et al. | |
| 2004/0129112 A1 | 7/2004 | Gillis et al. | |
| 2004/0152808 A1 | 8/2004 | Tezuka et al. | |
| 2004/0197212 A1 | 10/2004 | Roby | |
| 2004/0223847 A1 | 11/2004 | Cvjeticanin et al. | |
| 2004/0242737 A1 | 12/2004 | Topulos | |
| 2005/0029494 A1 | 2/2005 | Kirchner et al. | |
| 2005/0049096 A1 | 3/2005 | Eck | |
| 2005/0051933 A1 | 3/2005 | Platner et al. | |
| 2005/0186438 A1 | 8/2005 | Alms et al. | |
| 2005/0199203 A1 | 9/2005 | Stein | |
| 2005/0205425 A1 | 9/2005 | Palumbo et al. | |
| 2005/0225485 A1 | 10/2005 | Aisenbrey | |
| 2006/0125282 A1 | 6/2006 | Theuerkauf | |
| 2006/0135282 A1 | 6/2006 | Palumbo et al. | |
| 2006/0229416 A1 | 10/2006 | Walker et al. | |
| 2006/0292385 A1 | 12/2006 | Renekn et al. | |

(Continued)

FOREIGN PATENT DOCUMENTS

DE 7719322 1/1978
DE 3606052 7/1986

(Continued)

OTHER PUBLICATIONS

Extended European Search Report of European Application No. 08836654.7 dated Apr. 7, 2011.

(Continued)

*Primary Examiner* — Kevin R Kruer
(74) *Attorney, Agent, or Firm* — Rankin, Hill & Clark LLP

(57) ABSTRACT

Metal coated organic polymer compositions are useful as vehicular transmission parts. Such parts may have lighter weight, and/or superior corrosion resistance, and/or be more easily fabricated than similar conventional transmission parts.

22 Claims, No Drawings

(56) References Cited

U.S. PATENT DOCUMENTS

| | | |
|---|---|---|
| 2007/0173619 A1 | 7/2007 | Yu et al. |
| 2007/0203271 A1 | 8/2007 | Alms et al. |
| 2008/0312403 A1 | 12/2008 | Stockel et al. |

FOREIGN PATENT DOCUMENTS

| | | |
|---|---|---|
| DE | 19909191 | 9/2000 |
| DE | 10238517 | 10/2003 |
| WO | 2005120798 | 12/2005 |
| WO | 2006063469 | 6/2006 |
| WO | 2006114429 | 11/2006 |
| WO | 2007089585 | 8/2007 |

OTHER PUBLICATIONS

Extended European Search Report of PCT/US2008/011339 dated May 4, 2012.
International Search Report for PCT/US2008/011364 dated Apr. 7, 2010.
International Search Report for PCT/US2008/011364 dated Dec. 12, 2008.
International Search Report for PCT/US2008/011337 dated Apr. 4, 2010.
International Search Report for PCT/US2008/011337 dated Dec. 5, 2008.
International Search Report for PCT/US2008/011355 dated Apr. 7, 2010.
International Search Report for PCT/US2008/011355 dated Dec. 5, 2008.
International Search Report for PCT/US2008/011339 dated Apr. 7, 2010.
International Search Report for PCT/US2008/011339 dated Dec. 11, 2008.
International Search Report for PCT/US2008/011351 dated Apr. 7, 2010.
International Search Report for PCT/US2008/011351 dated Dec. 2, 2008.
Office Action of U.S. Appl. No. 12/681,351 dated Nov. 23, 2011.
Office Action of U.S. Appl. No. 12/681,351 dated May 9, 2012.
Office Action of U.S. Appl. No. 12/681,354 dated Mar. 14, 2012.
Office Action of U.S. Appl. No. 12/681,355 dated May 9, 2012.
Office Action of U.S. Appl. No. 12/681,357 dated Jan. 5, 2012.
Final Office Action of U.S. Appl. No. 12/681,354 dated Jul. 6, 2012, fourteen pages.
International Search Report for PCT/US2008/011363; Dated Apr. 7, 2010.
Office Action of U.S. Appl. No. 12/681,354 dated Sep. 7, 2012.
International Search Report of PCT/US2008/011363 dated Dec. 12, 2008.
Office Action of U.S. Appl. No. 12/681,351 dated Oct. 25, 2012.
Office Action of U.S. Appl. No. 12/681,355 dated Oct. 12, 2012.
Office Action of U.S. Appl. No. 12/681,359 dated Jan. 17, 2013, 40 pages.
Office Action of U.S. Appl. No. 12/681,354 dated Feb. 1, 2013, 25 pages.

* cited by examiner

VEHICULAR TRANSMISSION PARTS

FIELD OF THE INVENTION

Organic polymers which are metal plated are useful for vehicular transmission parts.

TECHNICAL BACKGROUND

Vehicles such as automobiles, trucks, motorcycles, scooters, recreational and all terrain vehicles, farm equipment such as tractors, and construction equipment such as bulldozers and graders are of course important items in modern society, and they are made of a myriad of parts. Most vehicles also have a transmission which transmits the power generated by the engine to the wheels or tracks. Many of these parts must have certain minimum physical properties such as stiffness and/or strength. Traditionally these types of parts have been made from metals such as steel, aluminum, zinc, and other metals, but in recent decades organic polymers have been increasingly used for such parts for a variety of reasons. Such polymeric parts are often lighter, and/or easier (cheaper) to fabricate especially in complicated shapes, and/or have better corrosion resistance. However such polymeric parts have not replaced metals in some application because the they are not stiff and/or strong enough, or have other property deficiencies compared to metal.

Thus vehicle manufacturers have been searching for ways to incorporate more polymeric materials into their vehicles for a variety of reasons, for example to save weight, lower costs, or provide more design freedom. Thus improved polymeric transmission parts (TPs) have been sought by vehicle manufacturers. It has now been found that metal plated organic polymeric TPs have the properties desired.

Metal plated polymeric parts have been used in vehiiles, especially for ornamental purposes. Chrome or nickel plating of visible parts, including polymeric parts, has long been done. In this use the polymer is coated with a thin layer of metal to produce a pleasing visual effect. The amount of metal used is generally the minimum required to produce the desired visual effect and be durable.

U.S. Pat. No. 4,406,558 describes a gudgeon pin for an internal combustion engine which is metal plated polymer. U.S. Pat. No. 6,595,341 describes an aluminum plated plastic part for a clutch. Neither of these patents mentions TPs.

SUMMARY OF THE INVENTION

This invention concerns a vehicular transmission part, comprising an organic polymer composition which is coated at least in part by a metal.

This invention concerns a vehicle transmission comprising a part, which comprises an organic polymer composition which is coated at least in part by a metal.

DETAILS OF THE INVENTION

Herein certain terms are used and some of them are defined below:

By an "organic polymer composition" is meant a composition which comprises one or more organic polymers. Preferably one or more of the organic polymers is the continuous phase.

By an "organic polymer" (OP) is meant a polymeric material which has carbon-carbon bonds in the polymeric chains and/or has groups in the polymeric chains which have carbon bound to hydrogen and/or halogen. Preferably the organic polymer is synthetic, i.e., made by man. The organic polymer may be for example a thermoplastic polymer (TPP), or a thermoset polymer (TSP).

By a "TPP" is meant a polymer which is not crosslinked and which has a melting point and/or glass transition point above 30° C., preferably above about 100° C., and more preferably above about 150° C. The highest melting point and/or glass transition temperature is also below the point where significant thermal degradation of the TPP α-curs. Melting points and glass transition points are measured using ASTM Method ASTM D3418-82. The glass transition temperature is taken at the transition midpoint, while the melting point is measured on the second heat and taken as the peak of the melting endotherm.

By a "TSP" is meant a polymeric material which is crosslinked, i.e., is insoluble in solvents and does not melt. It also refers to this type of polymeric material before it is crosslinked, but in the final TP, it is crosslinked. Preferably the crosslinked TSP composition has a Heat Deflection Temperature of about 50° C., more preferably about 100° C., very preferably about 150° C. or more at a load of 0.455 MPa (66 psi) when measured using ASTM Method D648-07.

By a polymeric "composition" is meant that the organic polymer is present together with any other additives usually used with such a type of polymer (see below).

By "coated with a metal" is meant part or all of one or more surfaces of the TP is coated with a metal. The metal does not necessarily directly contact a surface of the organic polymer composition. For example an adhesive may be applied to the surface of the organic polymer and the metal coated onto that. Any method of coating the metal may be used (see below).

By "metal" is meant any pure metal or alloy or combination of metals. More than one layer of metal may be present, and the layers may have the same or different compositions.

Transmissions are found in most self-propelled vehicles, the main types being manual transmissions, automatic transmissions, continuously variable transmissions, and transfer cases, all of which are included herein. Virtually all transmissions have a housing which houses most of the operating parts of the transmission. This housing is typically bolted to the engine and/or frame or chassis of the vehicle and usually supports the considerable weight of the transmission and perhaps other components attached to the transmission such as part of the drive shaft.

Parts of the transmission that can be made from the metal coated OP composition described herein include the transmission case and other parts of the external housings, for manual transmissions and transfer cases one or more of the transmission forks, shift linkage, gears, gear sets and synchronizers, and for automatic transmissions the valve body, torque converter, clutch plates, clutch disks, pump and gear sets, for continuously variable transmissions the drive belt, drive and driven pulleys, toroidal discs and rollers, variable displacement pumps and planetary gear sets.

While the metal coating usually provides improvement of physical properties such as strength and/or stiffness it may also provide other advantages to the parts it coats. Transmission fluid often has a deleterious effect on may polymers, so completely metal coating those portions of the OP compositions surface(s) that come into contact with the transmission fluid may decrease any degradation of the OP composition due to contact with transmission fluid. Since the metal is typically stronger and harder than the OP composition, metal coated parts often have better wear resistance, an advantage in items such as valve bodies where wear surfaces in the valves themselves need to be protected. Similarly manual transmission forks slide within retainers and must be able to withstand the friction generated in that operation and in shifting the gears.

If the major purpose of the metal coating is to improve something such as stiffness and/or wear resistance, it may not be necessary to completely coat the surface of the part involved, but merely to coat those sections which will result in the improvement of the property desired. For instance, to improve wear resistance in the valve body it may only be necessary to metal coat (some of) those surface in contact with moving parts. Conversely, the OP composition surface may be left uncoated by metal in contact areas where the OP surface is preferred. The metal coating may be patterned to efficiently improve a property such as stiffness.

If there are sealing surfaces involved, for example between parts of a transmission housing, which may seal using a gasket, it is important that the surfaces contacting the gasket do not deform in use in order to maintain a good seal. In this instance, it may be advantageous to metal coat, or metal coat with a thicker coating, those surfaces which press against the gasket to help seal the gap, so theses surfaces will not readily deform in use.

Useful TSPs include epoxy, phenolic, and melamine resins. Parts may be formed from the thermoset resin by conventional methods such as reaction injection molding or compression molding.

Useful TPPs include poly(oxymethylene) and its copolymers; polyesters such as poly(ethylene terephthalate), poly (1,4-butylene terephthalate), poly(1,4-cyclohexyldimethylene terephthalate), and poly(1,3-poropyleneterephthalate); polyamides such as nylon-6,6, nylon-6, nylon-12, nylon-11, and aromatic-aliphatic copolyamides; polyolefins such as polyethylene (i.e. all forms such as low density, linear low density, high density, etc.), polypropylene, polystyrene, polystyrene/poly(phenylene oxide) blends, polycarbonates such as poly(bisphenol-A carbonate); fluoropolymers including perfluoropolymers and partially fluorinated polymers such as copolymers of tetrafluoroethylene and hexafluoropropylene, poly(vinyl fluoride), and the copolymers of ethylene and vinylidene fluoride or vinyl fluoride; polysulfides such as poly(p-phenylene sulfide); polyetherketones such as poly (ether-ketones), poly(ether-ether-ketones), and poly(ether-ketone-ketones); poly(etherimides); acrylonitrile-1,3-butadiene-styrene copolymers; thermoplastic (meth)acrylic polymers such as poly(methyl methacrylate); and chlorinated polymers such as poly(vinyl chloride), polyimides, polyamideimides, vinyl chloride copolymer, and poly(vinylidene chloride). "Thermotropic liquid crystalline polymer" (LCP) herein means a polymer that is anisotropic when tested using the TOT test or any reasonable variation thereof, as described in U.S. Pat. No. 4,118,372, which is hereby incorporated by reference. Useful LCPs include polyesters, poly(ester-amides), and poly(ester-imides). One preferred form of LCP is "all aromatic", that is all of the groups in the polymer main chain are aromatic (except for the linking groups such as ester groups), but side groups which are not aromatic may be present. The TPPs may be formed into parts by the usual methods, such as injection molding, thermoforming, compression molding, extrusion, and the like.

The OP, whether a TSP, TPP or other polymer composition may contain other ingredients normally found in such compositions such as fillers, reinforcing agents such as glass and carbon fibers, pigments, dyes, stabilizers, toughening agents, nucleating agents, antioxidants, flame retardants, process aids, and adhesion promoters. Another class of materials may be substances that improve the adhesion to the resin of the metal to be coated onto the resin. Some of these may also fit into one or more of the classes named above.

The OP (composition) should preferably not soften significantly at the expected maximum operating temperature of the TPs. Different TPs may have different temperature requirements, depending on their location in the transmission. Since the metal coated OP composition is often present at least in part for enhanced structural purposes, it will better maintain its overall physical properties if no softening occurs. Thus preferably the OP for a particular part has a melting point and/or glass transition temperature and/or a Heat Deflection Temperature at or above the highest use temperature of the OP.

The OP composition (without metal coating) should also preferably have a relatively high flexural modulus, preferably at least about 1 GPa, more preferably at least about 2 GPa, and very preferably at least about 10 GPa. Flexural modulus is measured by ASTM Method D790-03, Procedure A, preferably on molded parts, 3.2 mm thick (⅛ inch), and 12.7 mm (0.5 inch) wide, under a standard laboratory atmosphere. Since these are structural parts, and are usually preferred to be stiff, a higher flexural modulus improves the overall stiffness of the metal coated TPs.

The OP composition may be coated with metal by any known methods for accomplishing that, such as vacuum deposition (including various methods of heating the metal to be deposited), electroless plating, electroplating, chemical vapor deposition, metal sputtering, and electron beam deposition. Preferred methods are electroless plating and electroplating, and a combination of the two. Although the metal may adhere well to the OP composition without any special treatment, usually some method for improving adhesion will be used. This may range from simple abrasion of the OP composition surface to roughen it, addition of adhesion promotion agents, chemical etching, functionalization of the surface by exposure to plasma and/or radiation (for instance laser or UV radiation) or any combination of these. Which methods may be used will depend on the OP composition to be coated and the adhesion desired. Methods for improving the adhesion of coated metals to many OPs are well known in the art. More than one metal or metal alloy may be plated onto the organic resin, for example one metal or alloy may be plated directly onto the organic resin surface because of its good adhesion, and another metal or alloy may be plated on top of that because it has a higher strength and/or stiffness.

Useful metals and alloys to form the metal coating include copper, nickel, iron-nickel, cobalt, cobalt-nickel, and chromium, and combinations of these in different layers. Preferred metals and alloys are copper, nickel, cobalt, cobalt-nickel, and iron-nickel, and nickel is more preferred.

The surface of the organic resin of the structural part may be fully or partly coated with metal. In different areas of the part the thickness and/or the number of metal layers, and/or the composition of the metal layers may vary.

When electroplating it is known that grain size of the metal deposited may be controlled by the electroplating conditions, see for instance U.S. Pat. Nos. 5,352,266 and 5,433,797 and U.S. Patent Publications 20060125282 and 20050205425, all of which are hereby included by reference. In one preferred form at least one of the metal layers deposited has an average grain size in the range of about 5 nm to about 200 nm, more preferably about 10 nm to about 100 nm. In another preferred form of electroplated metal, the metal has an average grain size of at least 500 nm, preferably at least about 1000 nm, and/or has an average maximum grain size of about 5000 nm.

For all these grain size preferences, it is preferred that that thickest metal layer, if there is more than one layer, be the specified grain size.

Some transmission parts also need abrasion resistance, since they are moving (in relationship to one or more other transmission parts) parts, and some or all of their surfaces rub against another surface. Metal surfaces are often more abrasion resistant than OP composition surfaces. This is especially true when the average grain size of the metal is small, preferably less than about 50 nm, more preferably less than about 25 nm. Such small grain sizes often have lower coefficients of friction against each other than larger grain sizes. Thus it is preferred that surfaces requiring lower coefficients of friction and/or better abrasion resistance have such small average grain sizes.

The thickness of the metal layer(s) deposited on the organic resin is not critical, being determined mostly by the desire to minimize weight while providing certain minimum physical properties such as modulus, strength and/or stiffness. These overall properties will depend to a certain extent not only on the thickness and type of metal or alloy used, but also on the design of the structural part and the properties of the organic resin composition.

In one preferred embodiment the flexural modulus of the metal coated TP is at least about twice, more preferably at least about thrice the flexural modulus of the uncoated OP composition. This is measured in the following way. The procedure used is ISO Method 178, using molded test bars with dimensions 4.0 mm thick and 10 mm wide. The testing speed is 2.0 mm/min. The composition from which the TPs are made is molded into the test bars, and then some of the bars are completely coated (optionally except for the ends which do not affect the test results) with the same metal using the same procedure used to coat the TP. The thickness of the metal coating on the bars is the same as on the TP. If the thickness on the TP varies, the test bars will be coated to the greatest metal thickness on the TP. The flexural moduli of the coated and uncoated bars are then measured, and these values are used to determine the ratio of flexural moduli (flexural modulus of coated/flexural modulus of uncoated). Generally speaking the thicker the metal coating, the greater the flexural modulus ratio between the uncoated and coated OP part.

For use as TPs, it is also important in many instances that the plated OP be tough, for example be able to withstand impacts. It has surprisingly been found that some of the metal plated OP compositions of the present invention are surprisingly tough. It has previously been reported (M. Corley, et al., *Engineering Polyolefins for Metallized Decorative Applications*, in Proceedings of TPOs in Automotive 2005, held Jun. 21-23, 2005, Geneva Switzerland, Executive Conference Management, Plymouth, Mich. 48170 USA, p. 1-6) that unfilled or lightly filled polyolefin plaques have a higher impact energy to break than their Cr plated analog. Indeed the impact strength of the plated plaques range from 50 to 86 percent of the impact strength of the unplated plaques. As can be seen from Examples 2-7 below, the impact maximum energies of the plated plaques are much higher than those of the unplated plaques. It is believed this is due to the higher filler levels of the OP compositions used, and in the present parts it is preferred that the OP composition have at least about 25 weight percent, more preferably about 35 weight percent, especially preferably at least about 45 weight percent of filler/reinforcing agent present. A preferred maximum amount of filler/reinforcing agent present is about 65 weight percent. These percentages are based on the total weight of all ingredients present. Typical reinforcing agents/fillers include carbon fiber, glass fiber, aramid fiber, particulate minerals such as clays (various types), mica, silica, calcium carbonate (including limestone), zinc oxide, wollastonite, carbon black, titanium dioxide, alumina, talc, kaolin, microspheres, alumina trihydrate, calcium sulfate, and other minerals.

It is preferred that the ISO179 impact energy (see below for procedure) of the metal plated TP be 1.2 times or more the impact energy of the unplated OP, more preferably 1.5 times or more. The test is run by making bars of the OP, and plating them by the same method used to make the TP, with the same thickness of metal applied. If the TP is metal plated on both sides (of the principal surfaces), the test bars are plated on both sides, while if the TP is plated on one side (of the principal surfaces) the test bars are plated on one side. The impact energy of the plated bars are compared to the impact energy of bars of the unplated OP.

Preferably the metal coating is about 0.010 mm to about 1.3 mm thick, more preferably about 0.025 mm to about 1.1 mm thick, very preferably about 0.050 to about 1.0 mm thick, and especially preferably about 0.10 to about 0.7 mm thick. It is to be understood that any minimum thickness mentioned above may be combined with any maximum thickness mentioned above to form a different preferred thickness range. The thickness required to attain a certain flexural modulus is also dependent on the metal chosen for the coating. Generally speaking the higher the tensile modulus of the metal, the less will be needed to achieve a given stiffness (flexural modulus).

Preferably the flexural modulus of the uncoated OP composition is greater than about 200 MPa, more preferably greater than about 500 MPa, and very preferably greater than about 2.0 GPa.

EXAMPLE 1

Zytel® 70G25, a nylon 6,6 product containing 25 weight percent chopped glass fiber available from E.I. DuPont de Nemours & Co., Inc. Wilmington, Del. 19898 USA, was injection molded into bars whose central section was 10.0 mm wide and 4.0 mm thick. Before molding the polymer composition was dried at 80° C. in a dehumidified dryer. Molding conditions were melt temperature 280-300° C. and a mold temperature of 80° C. Some of the bars were etched using Addipost® PM847 etch, reported to be a blend of ethylene glycol and hydrochloric acid, and obtained from Rohm & Haas Chemicals Europe. Less than 1 μm of copper was then electrolessly deposited on the surface, followed by 8 μm of electrolytically deposited copper, followed by 100 μm of nickel, on all surfaces. The flexural modulus was then determined, as described above, on the uncoated and metal coated bars. The uncoated bars had a flexural modulus of 7.7 GPa, and the metal coated bars had a flexural modulus of 29.9 GPa.

EXAMPLES 2-7

Ingredients used, and their designations in the tables are:
Filler 1-A calcined, aminosilane coated, kaolin, Polarite® 102A, available from Imerys Co., Paris, France.
Filler 2-Calmote® UF, a calcium carbonate available from Omya UK, Ltd., Derby DE21 6LY, UK.
Filler 3-Nyad® G, a wollastonite from Nyco Minerals, Willsboro, N.Y. 12996, USA.
Filler 4-M10-52 talc manufactured by Barretts Minerals, Inc., Dillon, Mont., USA.
Filler 5-Translink® 445, a treated kaolin available from BASF Corp., Florham Park, N.J. 07932, USA.
GF 1-Chopped (nominal length 3.2 mm) glass fiber, PPG® 3660, available from PPG Industries, Pittsburgh, Pa. 15272, USA.

GF 2-Chopped (nominal length 3.2 mm) glass fiber, PPG® 3540, available from PPG Industries, Pittsburgh, Pa. 15272, USA.

HS1— A thermal stabilizer containing 78% KI, 11% aluminum distearate, and 11% CuI (by weight).

HS2— A thermal stabilizer contain 7 parts KI, 11 parts aluminum distearate, and 0.5 parts CuI (by weight).

Lube—Licowax® PE 190-a polyethylene wax used as a mold lubricant available from Clariant Corp. Charlotte, N.C. 28205, USA.

Polymer A-Polyamide-6,6, Zytel® 101 available from E.I. DuPont de Nemours & Co., Inc. Wilmington, Del. 19810, USA.

Polymer B-Polyamide-6, Durethan® B29 available from Laxness AG, 51369 Leverkusen, Germany.

Polymer C—An ethylene/propylene copolymer grafted with 3 weight percent maleic anhydride.

Polymer D—A copolyamide which is a copolymer of terephthalic acid, 1,6-diaminohexane, and 2-methyl-1, 5-diaminopentane, in which each of the diamines is present in equimolar amounts.

Polymer E-Engage®08180, an ethylene/1-octene co-polymer available by Dow Chemical Co., Midland, Mich., USA.

Wax 1-N,N'-ethylene bisstearamide

Wax 2-Licowax® OP, available from Clariant Corp. Charlotte, N.C. 28205, USA.

The organic polymer compositions used in these examples are listed in Table 1. The compositions were made by melt blending of the ingredients in a 30 mm Werner & Pfleiderer 30 mm twin screw extruder.

TABLE 1

| Ex. | 2 | 3 | 4 | 5 | 6 | 7 |
|---|---|---|---|---|---|---|
| Polymer A | | | | | | 58.38 |
| Polymer B | | | 59.61 | | | |
| Polymer C | 2.00 | 0.90 | | 5.00 | 16.90 | 8.44 |
| Polymer D | 55.00 | 35.97 | | 34.32 | 46.95 | |
| Polymer E | 3.00 | 1.10 | | | | |
| Color concentrate | | 1.00 | | | | |
| Filler 1 | | | | 6.00 | 29.25 | 16.25 |
| Filler 2 | | | 25.00 | | | |
| Filler 3 | | 15.00 | | | | |
| Filler 4 | | 0.35 | | | | |
| Filler 5 | 40.00 | | | | | |
| GF 1 | | 45.00 | | 54.00 | 3.25 | 16.25 |
| GF 2 | | | 15.00 | | | |
| HS1 | | 0.43 | | 0.43 | 0.43 | 0.43 |
| HS2 | | | 0.09 | | | |
| Lube | | | | 0.25 | 0.25 | 0.25 |
| Wax 1 | | 0.30 | | | | |
| Wax 2 | 0.25 | | | | | |

The test pieces, which were 7.62×12.70×0.30 cm plaques or ISO 527 test bars, 4 mm thick, gauge width 10 mm, were made by injection molding under the conditions given in Table 2. Before molding the polymer compositions were dried for 6-8 hr in dehumidified air under the temperatures indicated, and had a moisture content of <0.1% before molding.

TABLE 2

| Ex. | Drying Temp., °C. | Melt Temp., °C. | Mold Temp., °C. |
|---|---|---|---|
| 2 | 100 | 320-330 | 140-160 |
| 3 | 100 | 320-330 | 140-160 |
| 4 | 80 | 210-230 | 80 |
| 5 | 100 | 320-330 | 140-160 |
| 6 | 100 | 320-330 | 140-160 |
| 7 | 100 | 320-330 | 140-160 |

These test specimens were then etched in sulfochromic acid or Rohm & Haas Chrome free etching solution, and rendered conductive on all surface by electroless deposition of a very thin layer of Ni. Subsequent galvanic deposition of 8μm of Cu was followed by deposition of a 100μm thick layer of fine-grain Ni—Fe (45-55% Fe by weight) using a pulsed electric current, as described in U.S. Pat. No. 5,352,266 for making fine grain size metal coatings.

The samples were tested by one or both of the following methods:

ISO 6603-2-Machine Instron® Dynatup Model 8250, Support Ring 40 mm dia, Hemispherical Tup 20 mm dia, Velocity 2.2 m/s, Impacter weight 44.45 kg, Temperature 23° C., Condition dry as made. Test were run on the plaques described above.

ISO 179-1eU-Sample Unnotched, Pendulum energy 25 J, Impact velocity 3.7 m/s, Temperature 23° C., Condition dry as made. Tests were run on the gauge part of the ISO 527 test bars described above.

Testing results are given in Table 3.

TABLE 3

| | ISO 6603-2 | | | | ISO 179 | |
|---|---|---|---|---|---|---|
| | Maximum Energy, J | | Maximum Load, kN | | $kJ/m^2$ | |
| Ex. | Unplated | Ni—Fe Plated | Unplated | Ni—Fe Plated | Unplated | Ni—Fe Plated |
| 2 | | | | | 90.4 | 109 |
| 3 | 2.5 | 6.8 | 1.0 | 2.7 | 50.2 | 100 |
| 4 | 2.3 | 16.2 | 0.9 | 5.0 | 60.3 | 129 |
| 5 | 10.0 | 15.0 | 2.6 | 4.0 | 53.6 | 108 |
| 6 | 8.5 | 23.3 | 1.8 | 4.7 | 40.7 | 87 |
| 7 | 7.8 | 24.3 | 2.3 | 6.8 | | |

What is claimed is:

1. A vehicular transmission part, comprising an organic polymer composition which is coated at least in part only on its surface by a metal,
wherein said organic polymer composition includes a filler and a reinforcing agent, the reinforcement agent being one of a glass fiber and a carbon fiber,
wherein said metal coating deposited on the surface of the reinforced organic polymer composition is 0.010 mm to 1.3 mm thick and includes at least two layers including a layer comprising Cu and a layer comprising Ni, at least one layer of said metal coating has an average grain size of 5 nm to 200 nm,
wherein an impact energy according to ISO 0179 of a metal coated section of said organic polymer composition is at least 1.5 times an impact energy of an uncoated section of said organic polymer composition,
wherein the impact energy of the uncoated section of the organic polymer composition is in the range of 40.7 $kJ/m^2$ to 90.4 $kJ/m^2$, and
wherein the transmission part is at least one of a transmission case or other part of an external housing, for manual a transmission or transfer case a transmission fork, shift linkage, gear, gear set, or synchronizer, for an automatic transmission a valve body, torque converter, clutch plate, clutch disk, pump, or gear set, for a continuously variable transmission a drive belt, drive or driven pulley, toroidal disc or roller, a variable displacement pump, or a planetary gear set.

2. The vehicular transmission part as recited in claim 1 wherein said organic polymer composition is one of a thermoplastic and thermoset, wherein said organic polymer composition, if a thermoplastic has a melting point and/or a glass transition point of 100° C. or more, or, if a thermoset has a heat deflection temperature of 100° C. or more at a load of 0.455 MPa.

3. The vehicular transmission part as recited in claim 1 wherein said vehicular transmission part is metal coated on at least one of an exterior surface and interior surface of said vehicular transmission part.

4. The vehicular transmission of claim 1, wherein the surface of said organic polymer composition is completely coated by said metal.

5. The vehicular transmission part of claim 1, wherein the filler/reinforcing agent is at least 25% weight of the organic polymer composition.

6. The vehicular transmission part of claim 1, wherein the filler/reinforcing agent is at least 35% weight of the organic polymer composition.

7. The vehicular transmission part of claim 1, wherein the filler/reinforcing agent is at least 45% weight of the organic polymer composition.

8. The vehicular transmission part of claim 1, wherein a flexural modulus of a metal coated section of the organic polymer composition is at least 2 times a flexural modulus of an uncoated section of the organic polymer composition.

9. The vehicular transmission part of claim 8, wherein the flexural modulus of the metal coated section of the organic polymer composition is at least 3 times the flexural modulus of the uncoated section of the organic polymer composition.

10. The vehicular transmission part of claim 8, wherein the flexural modulus of the uncoated section of the organic polymer composition is greater than 200 MPa.

11. The vehicular transmission part of claim 8, wherein the flexural modulus of the uncoated section of the organic polymer composition is greater than 500 MPa.

12. The vehicular transmission part of claim 8, wherein the flexural modulus of the uncoated section of the organic polymer composition is greater than 2.0 GPa.

13. The vehicular transmission part as recited in claim 1 wherein a thickest layer of said metal coating has an average grain size of at least 500 nm to 5,000 nm.

14. The vehicular transmission part as recited in claim 1 wherein said metal coating is 0.025 mm to 1.3 mm thick.

15. The vehicular transmission part of claim 1, wherein said metal coating has a total thickness ranging from 10 microns to 0.7 mm and contains a layer comprising Cu.

16. The vehicular transmission part of claim 1, comprising a polyamide optionally containing one or more additives selected from the group consisting of pigments, dyes, stabilizers, toughening agents, nucleation agents, antioxidants, flame retardants, process aids, and adhesion promoters.

17. The vehicular transmission of claim 1, wherein the impact energy of the metal coated section of the organic polymer composition is in the range of at least 87 kJ/m² to 109 kJ/m².

18. A vehicular transmission part, comprising an organic polymer composition which is coated at least in part only on its surface by a metal,
wherein said organic polymer composition includes a filler and a reinforcing agent, the reinforcement agent being one of a glass fiber and a carbon fiber,
wherein said metal coating deposited on the surface of the reinforced organic polymer composition is 0.010 mm to 1.3 mm thick and includes at least two layers including a layer comprising Cu and a layer comprising Ni, at least one layer of said metal coating has an average grain size of 5 nm to 200 nm,
wherein an impact energy according to ISO 0179 of a metal coated section of said organic polymer composition is at least 1.5 times an impact energy of an uncoated section of said organic polymer composition,
wherein the impact energy of the metal coated section of the organic polymer composition is in the range of at least 87 kJ/m² to 109 kJ/m², and
wherein the transmission part is at least one of a transmission case or other part of an external housing, for manual a transmission or transfer case a transmission fork, shift linkage, gear, gear set, or synchronizer, for an automatic transmission a valve body, torque converter, clutch plate, clutch disk, pump, or gear set, for a continuously variable transmission a drive belt, drive or driven pulley, toroidal disc or roller, a variable displacement pump, or a planetary gear set.

19. The vehicular transmission of claim 18, wherein the impact energy of the uncoated section of the organic polymer composition is in the range of 40.7 kJ/m² to 90.4 kJ/m².

20. The vehicular transmission of claim 18, wherein the surface of said organic polymer composition is completely coated by said metal.

21. A vehicular transmission part comprising:
an organic polymer composition having an exterior surface and an interior surface each of which is coated at least in part by a metal having a microstructure which is fine-grained, wherein said metal coating contains a layer comprising Cu and at least one layer comprising Ni, ,
wherein the organic polymer composition includes a reinforcing agent which is about 65% by weight of the organic polymer composition,
wherein an impact energy according to ISO 0179 of a metal coated section of the organic polymer composition is at least 1.5 times an impact energy of an uncoated section of the organic polymer composition,
wherein a flexural modulus of the coated section of the organic polymer composition is at least 2 times the flexural modulus of the uncoated section of the organic polymer composition, and
wherein the transmission part is at least one of a transmission case or other part of an external housing, for manual a transmission or transfer case a transmission fork, shift linkage, gear, gear set, or synchronizer, for an automatic transmission a valve body, torque converter, clutch plate, clutch disk, pump, or gear set, for a continuously variable transmission a drive belt, drive or driven pulley, toroidal disc or roller, a variable displacement pump, or a planetary gear set.

22. The vehicular transmission part of claim 21, wherein a flexural modulus of the uncoated section of the organic polymer composition is greater than 200 MPa.

* * * * *